United States Patent

Doorbar et al.

[11] Patent Number: 5,222,296
[45] Date of Patent: Jun. 29, 1993

[54] METHOD OF MAKING A FIBRE REINFORCED METAL COMPONENT

[75] Inventors: Phillip J. Doorbar, Derby; Ian D. A. Sudds, Lancashire, both of England

[73] Assignee: Rolls-Royce plc, London, England

[21] Appl. No.: 739,519

[22] Filed: Aug. 2, 1991

[30] Foreign Application Priority Data

Sep. 1, 1990 [GB] United Kingdom ............... 9019093

[51] Int. Cl.$^5$ ............................................. B23P 15/00
[52] U.S. Cl. ............................ 29/889.21; 29/419.1; 29/889.22; 29/889.23; 228/194
[58] Field of Search ........... 29/889.21, 889.22, 889.23, 29/888.06, 419.1; 228/194

[56] References Cited

U.S. PATENT DOCUMENTS

| | | | |
|---|---|---|---|
| 2,613,058 | 10/1952 | Atkinson | 29/889.21 |
| 2,618,462 | 11/1952 | Kane | 29/889.21 |
| 3,532,439 | 10/1970 | Palfreyman et al. | 29/889.21 |
| 3,675,294 | 7/1972 | Palfreyman et al. | 29/889.21 |
| 4,292,725 | 10/1981 | Larsson et al. | 29/419.1 |
| 4,570,316 | 2/1986 | Sakamakis et al. | 29/419.1 |
| 4,589,176 | 5/1986 | Ressman et al. | 29/419.1 |
| 4,697,324 | 10/1987 | Grant et al. | 29/419.1 |
| 4,809,903 | 3/1989 | Eylon et al. | 228/194 |
| 4,907,736 | 3/1990 | Doble . | |
| 5,042,710 | 8/1991 | Sievers et al. | 29/419.1 |

FOREIGN PATENT DOCUMENTS 2078338 6/1982 United Kingdom .
1198675 11/1988 United Kingdom .

*Primary Examiner*—Irene Cuda
*Attorney, Agent, or Firm*—Cushman, Darby & Cushman

[57] ABSTRACT

A ceramic fibre reinforced metal rotor with integral rotor blades is manufactured using a continuous strip of unidirectional ceramic fibres in a metal matrix. The continuous strip of ceramic fibres in the metal matrix is cut into a plurality of separate pieces of predetermined length. The separate pieces of ceramic fibres in the metal matrix are arranged alternately in a spiral, with separate pieces of unreinforced metal matrix in adjacent abutting relationship to form a ring which has a plurality of laminations. The ring of laminations of metal matrix composite pieces and unreinforced metal matrix pieces are arranged between an inner and an outer metal ring to form an assembly. The assembly is consolidated by hot isostatic pressing using radially applied pressure. The separate pieces of metal matrix composite provide compliance to reduce breaking or buckling of the fibres, and the pieces of unreinforced metal matrix prevents damage spreading between laminations.

21 Claims, 3 Drawing Sheets

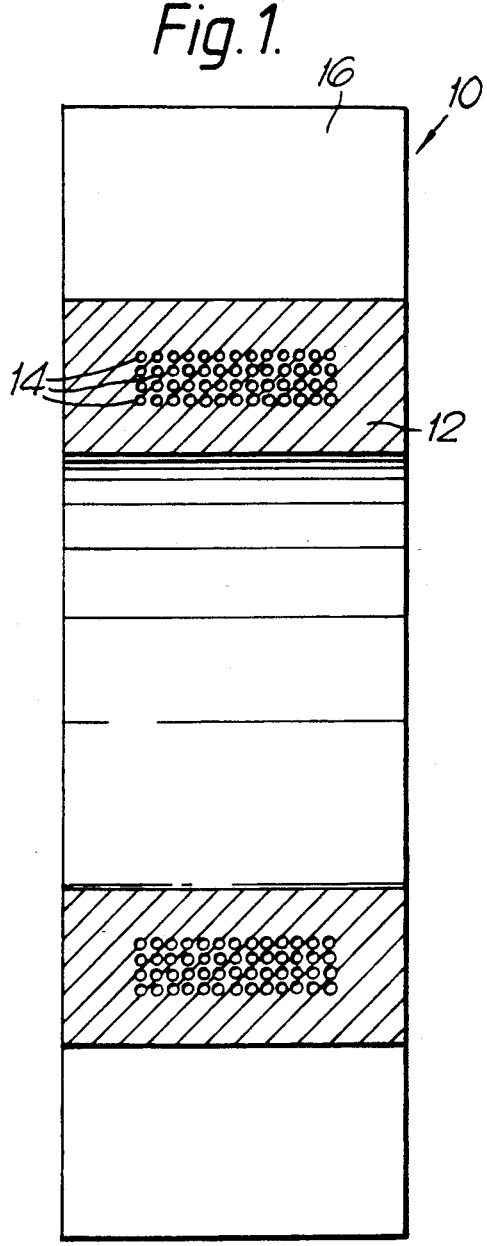
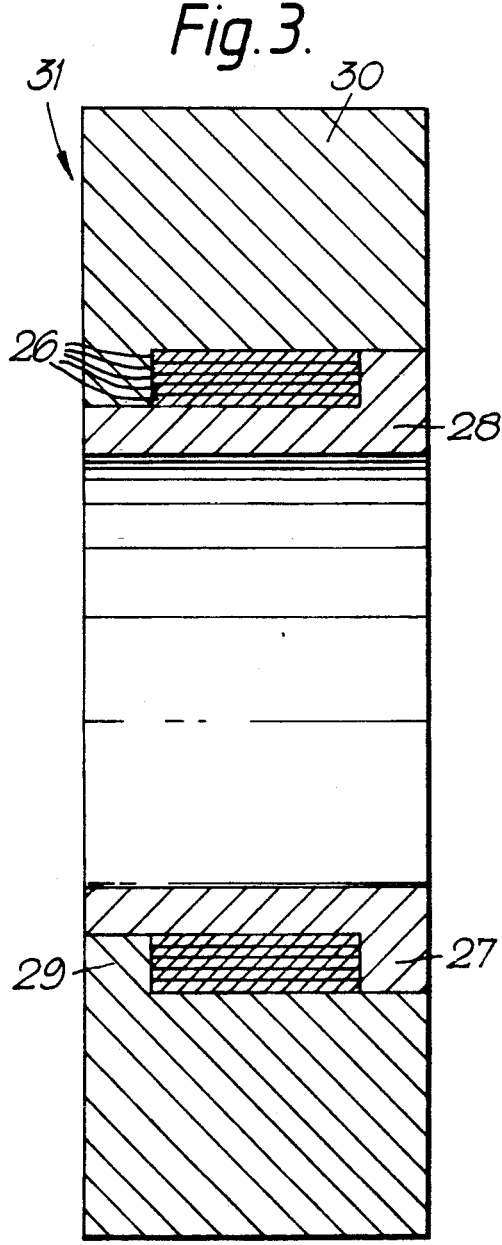
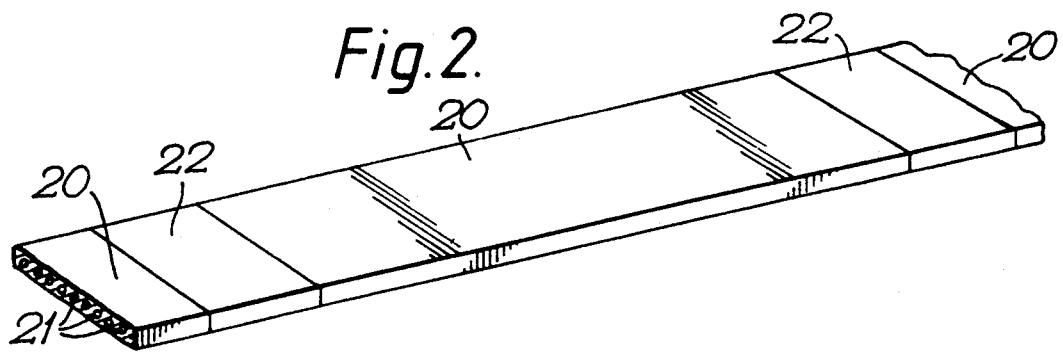

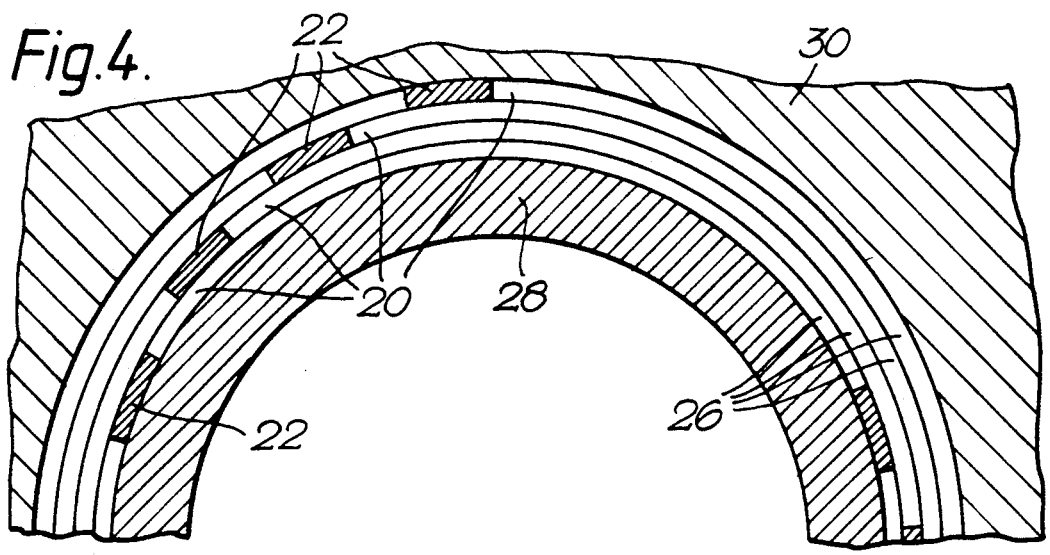
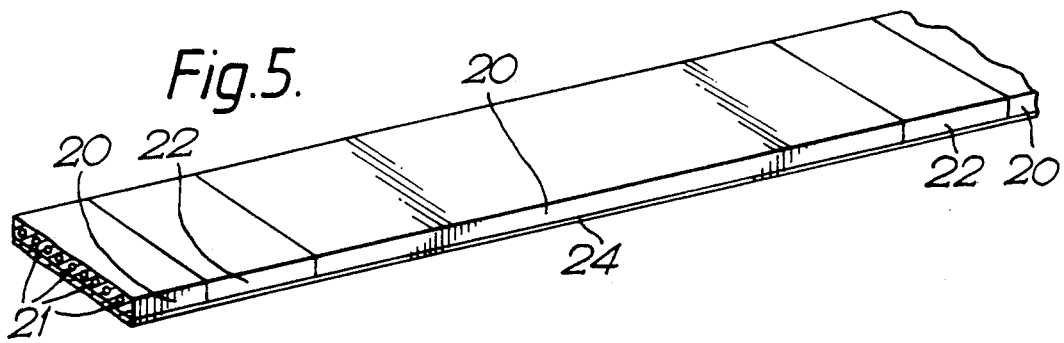
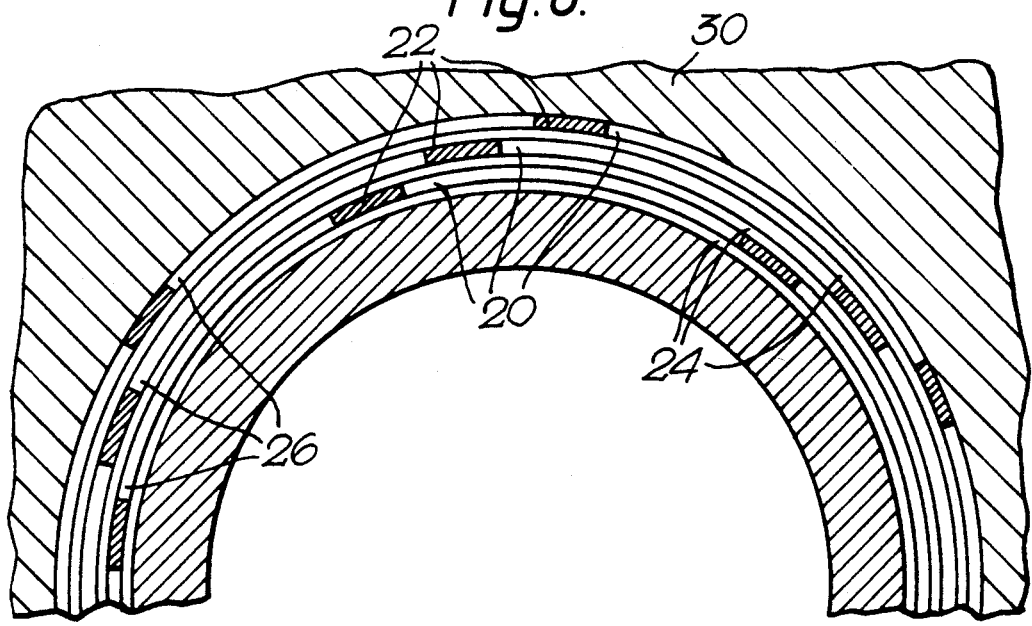

METHOD OF MAKING A FIBRE REINFORCED METAL COMPONENT

BACKGROUND OF THE INVENTION

Introduction

The present invention relates to a method of manufacturing fibre reinforced metal components, particularly fibre reinforced metal rings, cylinders and discs.

DESCRIPTION OF THE RELATED ART

The ideal arrangement for a fibre reinforced metal ring, or disc, is to arrange the fibres circumferentially such that they extend continuously without breaks in a fully dense metal matrix. This is difficult to achieve because a certain amount of movement is required in practice to achieve good diffusion bonding, and density, between the layers of fibres. The fibres used to reinforce the metal matrix are ceramic, and ceramic fibres have very low extension to failure values, typically 1%. On consolidation using radial pressure from the inside surface of the ring the continuous ceramic fibres are placed under high tensile stress resulting in filament breakage and loss of structural integrity. On consolidation using radial pressure from the outer surface of the ring, the continuous ceramic fibres are buckled which reduces structural integrity. On consolidation using radial pressure from both the inside and outside surfaces of the ring, the continuous ceramic fibres either break under high tensile stress for the radially inner layers of ceramic fibres or buckle for the radially outer layers of ceramic fibres. This resulting fibre reinforced metal ring therefore contains many random fibre breaks and thus the fibre reinforced metal ring has unknown levels of mechanical properties.

In one known method of manufacturing a fibre reinforced metal ring, as disclosed in UK Patent Application No. GB2168032A, a filament is wound spirally in a plane with matrix material between the turns of the spiral. The spiral is positioned between discs of matrix material, and is then pressed axially to consolidate the ring structure. This method produces little or no breaking of the fibres, however it is a laborious method.

In a further known method of manufacturing a fibre reinforced metal ring, as disclosed in UK Patent Application No. GB2078338A, a metal matrix tape, which has reinforcing fibres, is wound onto a mandrel and then inserted into a metal shaft. The fibres are arranged generally axially of the shaft. The assembly is pressed to consolidate the ring structure. This method does not have the ideal arrangement of fibres for a ring.

Another known method of manufacturing a fibre reinforced metal ring, as disclosed in UK patent Application No. GB2198675A, a continuous helical tape of fibres and a continuous helical tape of metal foil are interleaved. The interleaved helical tapes of fibres and metal foil are pressed axially to consolidate the assembly. This method produced little or no breaking of fibres.

SUMMARY OF THE INVENTION

The present invention seeks to provide a novel method of manufacturing fibre reinforced metal components.

Accordingly the present invention provides a method of manufacturing a fibre reinforced metal component comprising arranging at least one separate piece of metal matrix composite and at least one piece of unreinforced metal matrix alternately in adjacent abutting relationship to form at least one laminate, the at least one separate piece of metal matrix composite comprises a plurality of unidirectionally arranged fibres in a metal matrix, the at least one separate piece of metal matrix composite being arranged such that the fibres embedded in the metal matrix extend in the same directional sense, arranging the at least one laminate of at least one metal matrix composite piece and at least one piece of unreinforced metal matrix between a first metal member and a second metal member to form an assembly, consolidating the assembly to bond the first metal member, the at least one laminate of at least one metal matrix composite and the at least one piece of metal matrix and the second metal member to form a unitary composite component.

Preferably a plurality of separate pieces of metal matrix composite and a plurality of pieces of unreinforced metal matrix are arranged to form at least one laminate.

Preferably the at least one separate piece of metal matrix composite and the at least one piece of unreinforced metal matrix are arranged in a ring, the first metal member and the second metal member are rings.

Preferably a plurality of separate pieces of metal matrix composite and a plurality of pieces of unreinforced metal matrix are arranged in a spiral to form a plurality of laminates.

Alternately a plurality of separate pieces of metal matrix composite and a plurality of pieces of unreinforced metal matrix are arranged in concentric rings to form a plurality of laminates.

The pieces of metal matrix composite may have equal lengths.

The second metal ring is preferably positioned radially outwardly of the at least one laminate of metal matrix composite.

At least one rotor blade may be welded onto the second metal ring by friction welding or electron beam welding.

Preferably the second metal ring is machined to form at least one rotor blade integral with the second metal ring.

Preferably the second metal member is electrochemically machined to form the at least one rotor blade.

The separate pieces of metal matrix composite and the pieces of unreinforced metal matrix may be secured to a continuous backing strip to allow the separate pieces of metal matrix composite and the pieces of unreinforced metal matrix to be wound into a spiral.

The backing strip may comprise unreinforced metal matrix.

Preferably the backing strip comprises a plastic or other suitable material which is subsequently removed.

The first metal member, the second metal member and the metal matrix composite may comprise titanium, titanium aluminide, an alloy of titanium or any suitable metal, alloy or intermetallic which is capable of being bonded.

The fibres may comprise silicon carbide, silicon nitride, boron, alumina or other suitable ceramic fibres.

Preferably the consolidating process comprises hot isostatic pressing.

The consolidating process may alternately comprise differential hot expansion of a first ring inside a suitable low expansion second ring.

The pieces of metal matrix composite and the pieces of metal matrix are preferably arranged on the inner surface of the second metal ring, the first metal ring is moved coaxially into the second metal ring.

The second metal ring preferably has a radially inwardly extending flange at one axial end to locate the pieces of metal matrix composite and the pieces of metal matrix axially.

The first metal ring preferably has a radially outwardly extending flange at one axial end to locate the pieces of metal matrix composite and the pieces of metal matrix axially.

BRIEF DESCRIPTION OF THE DRAWINGS

The present invention will be fully described by way of example with reference to the accompanying drawings, in which:

FIG. 1 is a longitudinal cross-sectional view through a bladed compressor rotor made according to the present invention.

FIG. 2 is a perspective view of strips of unidirectional fibre reinforced metal matrix arranged alternately with inserts of unreinforced metal matrix.

FIG. 3 is a longitudinal cross-sectional view through an assembly of strips of undirectional fibre reinforced metal matrix and inserts of unreinforced metal matrix positioned between inner and outer metal rings.

FIG. 4 is an enlarged transverse cross-sectional view through the assembly in FIG. 3.

FIG. 5 is a perspective view of strips of unidirectional fibre reinforced metal matrix arranged alternately with inserts of unreinforced metal matrix on a backing strip.

FIG. 6 is an alternative enlarged transverse cross-sectioned view through the assembly in FIG. 3.

DETAILED DESCRIPTION OF THE PREFERRED EMBODIMENTS

Figure 7:
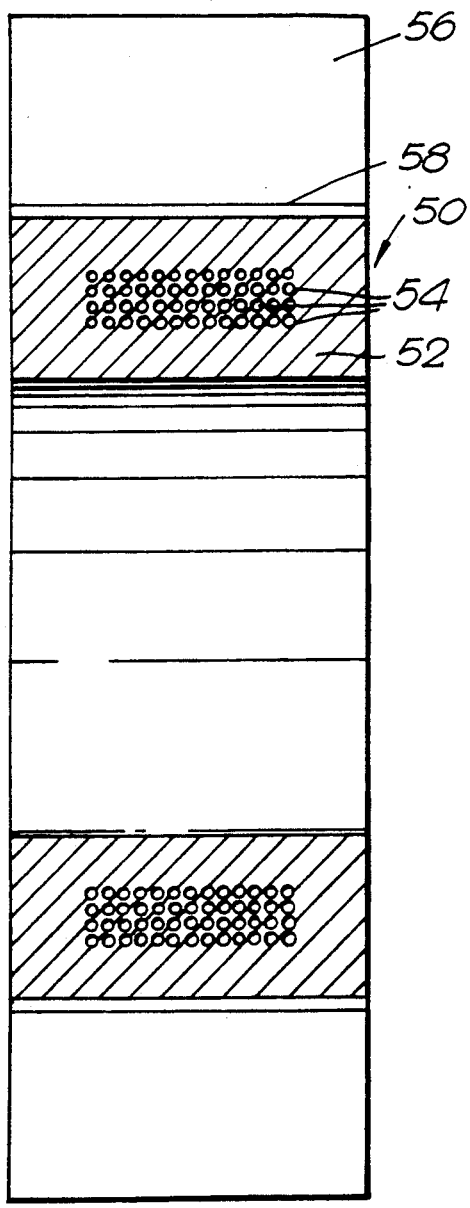
FIG. 7 is a longitudinal cross-sectional view through an alternative bladed compressor rotor made according to the present invention.

A finished ceramic fibre reinforced metal rotor 10 with integral rotor blades is shown in FIG. 1. The rotor comprises a metal ring 12 which includes a ring of circumferentially extending reinforcing ceramic fibres 14, which are fully diffusion bonded into the metal ring 12. A plurality of solid metal rotor blades 16, extend radially outwardly from and, are integral with the metal ring 12.

The ceramic fibre reinforced metal rotor 10 is manufactured using a conventional continuous strip containing a monolayer of unidirectional ceramic fibres embedded in a metal matrix. The continuous strip of unidirectional ceramic fibres in the metal matrix or metal matrix composite strip, is cut into a number of separate pieces of metal matrix composite. Each of the separate pieces of metal matrix composite is cut to a predetermined length dependent upon the diameter of the rotor and for other reasons which will be mentioned herein.

The separate pieces of metal matrix composite 20 are preferably arranged alternately with separate pieces of unreinforced metal matrix 22 in adjacent abutting relationship, as shown in FIG. 2. The pieces of unreinforced metal matrix also have predetermined lengths. The separate pieces of metal matrix composite 20 are arranged such that the ceramic fibres 21 in adjacent pieces extend in the same direction. The pieces of metal matrix composite 20 and the pieces of unreinforced metal matrix 22 are arranged in a spiral to form a ring which has a plurality of laminations 26, as shown in FIGS. 3 and 4, in which all the fibres extend circumferentially.

The lengths of the pieces of metal matrix composite 20 and the lengths of the pieces of unreinforced metal matrix 22 are selected to suite the diameter of the rotor, such that there is an optimum distribution of the unreinforced metal matrix pieces throughout the completed rotor to obtain a uniform distribution of strength throughout the circumference of the rotor. The distribution of unreinforced metal matrix pieces is such that they are not radially adjacent each other in adjacent laminations.

The laminations 26 of metal matrix composite pieces and unreinforced metal matrix pieces are arranged between an inner metal ring 28 and an outer metal ring 30 to form an assembly 31 as shown in FIG. 3.

The pieces of metal matrix composite 20 and the pieces of unreinforced metal matrix 22 are arranged in a spiral by placing the pieces alternately adjacent each other in end to end relationship on the inner surface of the outer metal ring 30. The outer metal ring 30 has a radially inwardly extending flange 29 at one axial end which locates the pieces axially. When the pieces of metal matrix composite and pieces of unreinforced metal matrix have been arranged in laminations to the internal diameter of the flange 29, the inner metal ring 28 is pushed coaxially into the outer metal ring 30. The inner metal ring 28 has a radially outwardly extending flange 27 at one axial end which abuts the pieces at the opposite axial end to the flange 29 of the outer metal ring 30. The inner diameter of flange 29 is substantially the same as the outer diameter of the inner metal ring 28 and the outer diameter of flange 27 is substantially the same as the inner diameter of the outer metal ring 30.

The assembly 31 is placed in a vacuum chamber which is subsequently evacuated, the flange 27 of the inner ring 28 is welded to the outer ring 30 and the flange 29 of the outer ring 30 is welded to the inner ring 28. Electron beam welding or other suitable welding processes may be used.

The assembly 31 is then consolidated using heat and pressure to form a fibre reinforced metal ring. The vacuum chamber is heated so as to heat the assembly 31 and a pressurising gas, for example argon, is introduced to apply pressure onto the assembly 31. The consolidation takes place using radial pressure on both the inside surface of the inner metal ring 28 and on the outside surface of the outer metal ring 30, and pressure is also applied on the axial surfaces of the rings. The application of heat and pressure to the assembly 31 is preferably by hot isostatic pressing.

The use of the plurality of separate pieces of metal matrix composite in the laminations provides the required degree of compliance in the assembly, to allow the ceramic fibres to move circumferentially without further breaking during the consolidation. The use of the plurality of separate pieces of unreinforced metal matrix between adjacent pieces of metal matrix composite allows the consolidation process to achieve full density and good diffusion bonding, and prevents fibres in a piece of metal matrix composite in an adjacent lamination becoming damaged due to the spreading of breakages. The incorporation of a piece of unreinforced metal matrix, i.e. a break in the ceramic fibres in a laminate is preferable to an area with several laminations each of which has broken ceramic fibres.

The outer metal ring 30 in FIG. 3 is much greater in radial dimension than the inner metal ring 28, so that after the assembly has been consolidated, the outer metal ring 30 is machined to produce a finished ceramic fibre reinforced metal rotor. The outer metal ring 30 may be machined to produce axially extending firtree, or dovetail, slots or may be machined to produce a circumferentially extending dovetail slot using conventional machining techniques to receive conventional compressor or turbine blades.

The outer metal ring 30 is much greater in radial dimension than the inner metal ring 28, so that after the assembly has been consolidated, the outer metal ring 30 may be machined, e.g. electrochemically machined, to produce the finished ceramic fibre reinforced metal rotor with integral blades as shown in FIG. 1. The outer metal ring 30 is more massive than the inner metal ring 28, and so the assembly is consolidated more in a radially outward direction.

In FIG. 5 the separate pieces of metal matrix composite 20, and the separate pieces of unreinforced metal matrix 22 are secured to a continuous backing strip 24 to allow the separate pieces of metal matrix composite 20 and unreinforced metal matrix 22 to be easily wound into a spiral. A ring formed from the backing strip 24, the pieces of metal matrix composite 20 and unreinforced metal matrix 22 is shown in FIG. 6. The backing strip 24 is a thin strip of unreinforced metal matrix which is consolidated into the final component structure. Alternatively the backing strip 24 may be a plastic, or other suitable material which may be subsequently burnt off when the spiral is in place between the inner and outer metal rings.

The ceramic fibres have for example diameters of the order of 140 microns and the metal matrix composite pieces have a thickness of for example of 0.01 inch=0.25 mm. When the laminates of metal matrix composite pieces are consolidated this gives a 35–45% volume fraction of ceramic fibres. The introduction of an unreinforced metal matrix backing strip reduces the volume fraction of ceramic fibres in the consolidated structure, therefore it is necessary for the backing strip to be relatively thin to minimise the reduction in volume fraction of ceramic fibres.

The pieces of metal matrix composite and the pieces of unreinforced metal matrix may alternatively be arranged in concentric laminations to form a ring in which the fibres extend circumferentially. The laminations, may comprise a single piece of metal matrix composite and a single piece of unreinforced metal matrix, or they may comprise a plurality of pieces of metal matrix and a plurality of pieces of unreinforced metal matrix.

The consolidation of the assembly of inner metal ring, laminations of metal matrix composite pieces and unreinforced metal matrix pieces and the outer metal ring may be performed by using an extra inner ring, or cylinder, of high expansion coefficient material and an extra outer ring, or cylinder, of low expansion coefficient material. The assembly is placed into a vacuum chamber, which is subsequently evacuated. The assembly is then consolidated using heat which causes the inner ring to expand more than the outer ring and thus consolidate the assembly to form a fibre reinforced metal ring. The edges of the inner and outer metal rings of the composite assembly may be electron beam welded together.

A further finished ceramic fibre reinforced metal rotor 50 with rotor blades is shown in FIG. 7. The rotor comprises a metal ring 52 which includes a ring of circumferentially extending reinforcing ceramic fibres 54, which are fully diffusion bonded into the metal ring 52. A plurality of solid metal rotor blades 56, extend radially outwardly from the metal ring 52. The rotor blades 56 are secured to the metal ring 52 by welds 58.

The pieces of metal matrix composite 20 and the pieces of unreinforced metal matrix 22 are arranged in a spiral by placing the pieces alternately adjacent each other in end to end relationship on the inner surface of the outer metal ring 64. The outer metal 64 has two radially inwardly extending flanges 63 and 65 at opposite axial ends which locate the pieces axially. When the pieces of metal matrix composite and pieces of unreinforced metal matrix have been arranged in laminations to the internal diameter of the flanges 63 and 65, the inner metal ring 62 is pushed coaxially into the outer metal ring 64.

Figure 8:
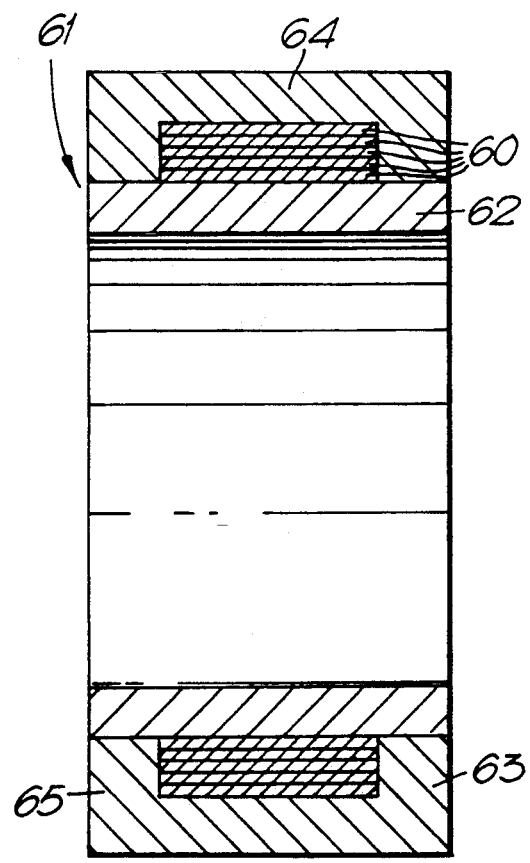
FIG. 8 is a longitudinal cross-sectional view through an assembly of strips of unidirectional fibre reinforced metal matrix and inserts of unreinforced metal matrix positioned between inner and outer metal rings.

The bladed rotor 50 is produced in a similar manner to that in FIG. 1, but the outer metal ring 64 has a much smaller radial dimension in FIG. 8 than that in FIG. 3. Therefore after the assembly has been consolidated, instead of electrochemically machining the outer metal ring 64 to produce the integral rotor blades, a plurality of solid metal rotor blades are electron beam welded or friction welded onto the outer metal ring 64.

The pieces of metal matrix composite and the pieces of unreinforced metal matrix may be arranged between two radially outwardly extending flanges on the inner metal ring, and the outer metal ring may be pushed coaxially onto the inner metal ring. Other suitable methods of locating the pieces between the inner and outer metal rings may be used.

The inner and outer metal rings may be titanium, titanium aluminide, any titanium alloy or any other metal, intermetallic or alloy which is capable of being bonded together. The metal matrix composite may be a matrix of titanium, aluminium, nickel or magnesium metal or alloy. The metal matrix composite may be reinforced with silicon carbide, silicon nitride, boron, alumina or other suitable ceramic fibres.

The consolidated fibre reinforced metal ring may be a finished or semi-finished component. The consolidated fibre reinforced metal ring may be a finished cylinder, casing or shaft. The consolidated fibre reinforced metal ring may be a semi-finished rotor.

We claim:

1. A method of manufacturing a fiber reinforced metal component comprising the steps of:

first arranging a plurality of separate pieces of metal matrix composite and a plurality of separate pieces of unreinforced metal matrix alternately in adjacent abutting relationship to form at least one laminate, the pieces of metal matrix composite having a plurality of unidirectionally arranged fibers in a metal matrix and the fibers of each piece of metal matrix composite extending in substantially the same direction, each piece of metal matrix composite having a first end and a second end, the fibers in each piece of metal matrix composite extending between the first end and the second end of the piece of metal matrix composite, the step of first arranging further including the step of arranging the pieces of metal matrix composite and the pieces of unreinforced metal matrix such that at least one of the first and second ends of each piece of metal matrix composite is in abutting relationship within an adjacent piece of unreinforced metal matrix;

second arranging the at least one laminate between a first metal member and a second metal member to form an assembly; and consolidating the assembly to bond the first metal member, the at least one laminate, and the second metal member to form a unitary composite component.

2. A method of manufacturing a fiber reinforced metal component comprising the steps of:

first arranging at least one piece of metal matrix composite and at least one piece of unreinforced metal matrix alternately in adjacent abutting relationship to form at least one annular laminate, the at least one piece of metal matrix composite having a plurality of unidirectionally arranged fibers in a metal matrix and the fibers of the at least one piece of metal matrix composite extending in substantially the same direction;

second arranging the at least one annular laminate between a first annular metal member and a second annular metal member to form an assembly; and consolidating the assembly to bond the first annular metal member, the at least one annular laminate, and the second annular metal member to form a unitary composite component.

3. A method as claimed in claim 2, wherein the first arranging step includes arranging the metal matrix composite which comprises a matrix of titanium, titanium aluminide, an alloy of titanium or any suitable metal, alloy or intermetallic which is capable of being bonded.

4. A method as claimed in claim 2, wherein the step of first arranging includes the step of arranging a plurality of separate pieces of metal matrix composite and a plurality of pieces of unreinforced metal matrix in a spiral to form a plurality of annular laminates.

5. A method as claimed in claim 2, wherein the step of first arranging includes the step of arranging a plurality of separate pieces of metal matrix composite and a plurality of separate pieces of unreinforced metal matrix in concentric rings to form a plurality of annular laminates.

6. A method as claimed in claim 2, wherein the step of first arranging includes arranging pieces of metal matrix composite having equal lengths.

7. A method as claimed in claim 2, wherein the step of second arranging includes arranging the second annular metal member radially outwardly of the at least one annular laminate.

8. A method as claimed in claim 7, further comprising the step of welding at least one rotor blade onto the second annular metal member.

9. A method as claimed in claim 8, wherein the welding step includes one of the steps of friction welding and electron beam welding the at least one rotor blade onto the second annular metal member.

10. A method as claimed in claim 7, further comprising the step of machining the second annular metal member to form at least one rotor blade integral with the second annular metal member.

11. A method as claimed in claim 10, wherein the step of machining includes the step of electrochemically machining the second annular member to form the at least one rotor blade.

12. A method as claimed in claim 7, wherein the second arranging step includes the steps of:

third arranging pieces of the metal matrix composite and pieces of the unreinforced metal matrix on an inner surface of the second annular metal member, and moving the first annular metal member coaxially into the second annular metal member.

13. A method as claimed in claim 12, wherein the step of third arranging includes arranging the second annular metal member which has a radially inwardly extending flange at one axial end to locate the pieces of metal matrix composite and the pieces of unreinforced metal matrix axially.

14. A method as claimed in claim 13, wherein the step of third arranging includes arranging the first annular metal member which has a radially outwardly extending flange at one axial end to locate the pieces of metal matrix composite and the pieces of unreinforced metal matrix axially.

15. A method as claimed in claim 2, wherein the first arranging step includes the step of securing pieces of metal matrix composite and pieces of unreinforced metal matrix to a continuous backing strip to allow the pieces of metal matrix composite and the pieces of unreinforced metal to be wound into a spiral.

16. A method as claimed in claim 15, wherein the securing is to a backing strip which comprises unreinforced metal matrix.

17. A method as claimed in claim 2, wherein the first arranging step includes arranging the metal matrix composite having fibers which comprise silicon carbide, silicon nitride, boron, alumina, or other suitable ceramic.

18. A method as claimed in claim 2, wherein the consolidating step comprises the step of hot isostatic pressing.

19. A method as claimed in claim 2, wherein the consolidating step comprises the step of differential hot expansion of the first annular metal member inside the second annular metallic member of suitably low expansion.

20. A method as claimed in claim 2, wherein the second arranging step includes arranging the first annular metal member and the second annular metal member each of which comprises titanium, titanium aluminide, an alloy of titanium or any suitable metal, alloy or intermetallic which is capable of being bonded.

21. A method as claimed in claim 15, wherein the securing is to a backing strip which comprises a plastic or other suitable material which is subsequently removed.

* * * * *